United States Patent Office 3,218,128
Patented Nov. 16, 1965

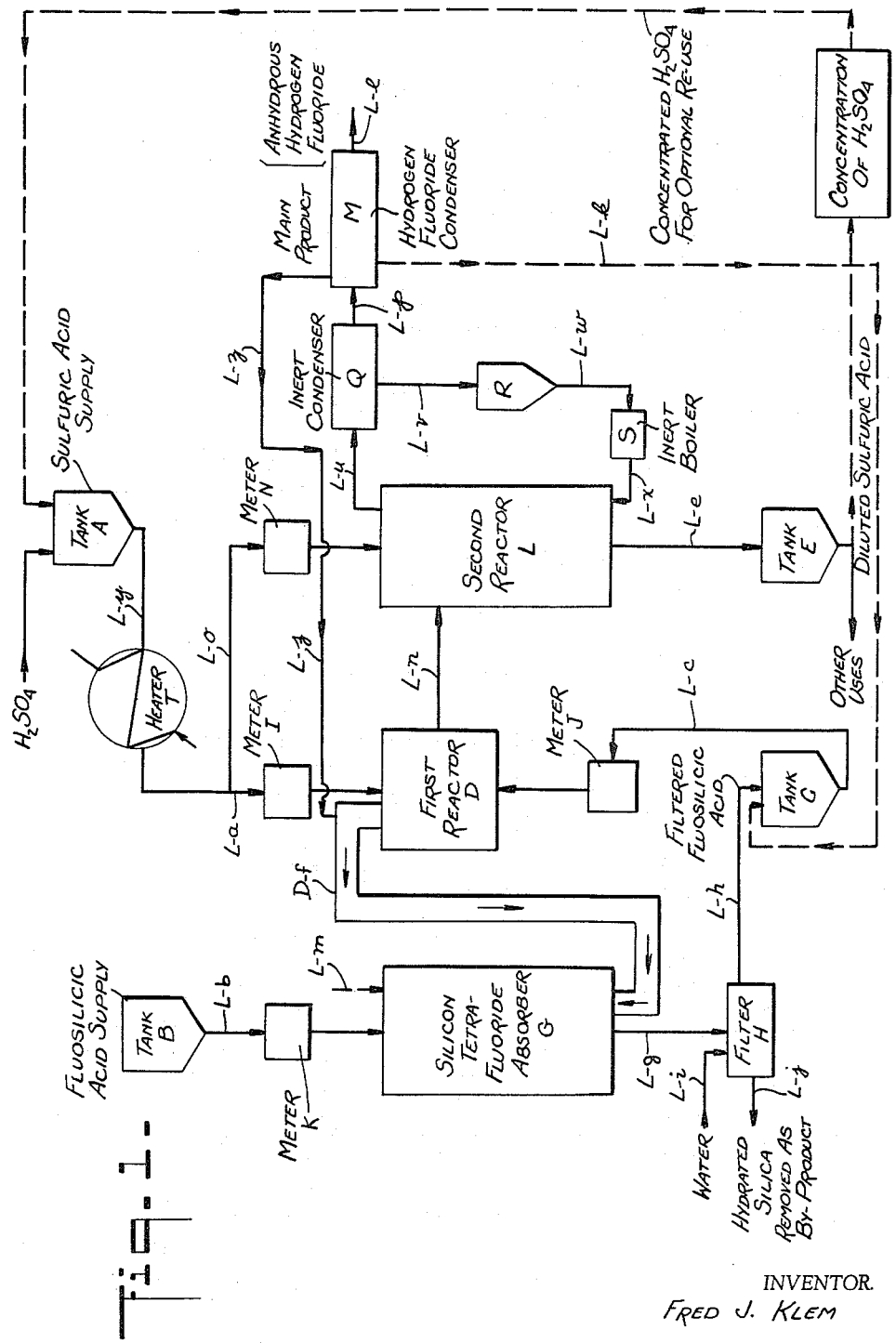

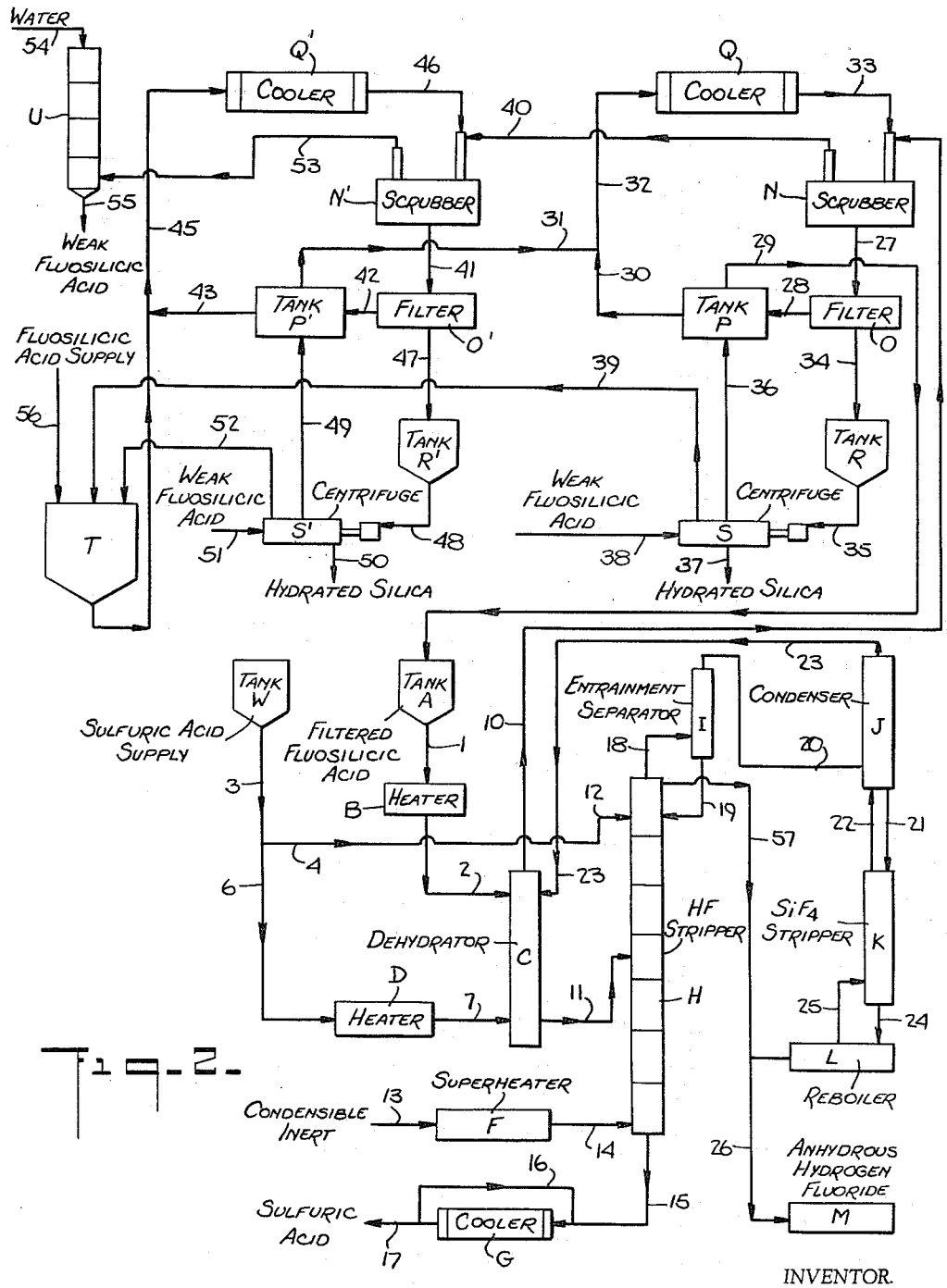

3,218,128
PROCESS OF PRODUCING HYDROGEN FLUORIDE IN A TWO-STAGE PROCEDURE AND EFFECTING A RAPID EVOLUTION AND AN EFFECTIVE RECOVERY OF THE HYDROGEN FLUORIDE BY SWEEPING THE SECOND STAGE WITH A CONDENSIBLE INERT GAS
Fred J. Klem, Tampa, Fla., assignor, by mesne assignments, to Tennessee Corporation, New York, N.Y., a corporation of Delaware
Filed Sept. 10, 1962, Ser. No. 222,424
9 Claims. (Cl. 23—153)

The present application is related to co-pending applications of Llewellyn C. Oakley, Jr. and Theodore T. Houston (Serial No. 222,526), of Theodore T. Houston and Gerald E. G. Wilkinson (Serial No. 222,527), of Gerald E. G. Wilkinson (Serial No. 222,447), and of Theodore T. Houston (Serial No. 222,443), all of which have been assigned to a common assignee.

The present invention relates to an improved process of producing hydrogen fluoride in a two-stage procedure and effecting a rapid evolution and an effective recovery of the hydrogen fluoride by sweeping the second stage with a condensible inert gas.

It is an object of the present invention to provide an improved process of producing hydrogen fluoride involving a two-stage procedure to effect a rapid evolution and an effective recovery of hydrogen fluoride by sweeping the second stage with a condensible inert gas.

Another object of the invention is to provide an improved process of producing hydrogen fluoride involving the dehydration and decomposition of clear fluosilicic acid with strong sulfuric acid under conditions of concentration of sulfuric acid, temperature and retention time so that substantially all of the silicon tetrafluoride is evolved in the first stage as a substantially dry gas and is reabsorbed in water to produce more fluosilicic acid while the hydrogen fluoride is retained in a weaker sulfuric acid solution and is effectively liberated in the second stage in an efficient manner by sweeping a condensible inert gas through the second reactor.

It is a further object of the invention to provide an improved process of producing hydrogen fluoride involving a two-stage procedure to retain substantially all of the hydrogen fluoride produced in the first stage in weak sulfuric acid and to liberate substantially all of the hydrogen fluoride in the second stage by sweeping the second reactor with a condensible inert gas.

The invention further contemplates providing an improved process of producing hydrogen fluoride in a two-stage procedure with practical equipment and operations on an industrial scale and incorporating provisions for sweeping the second reactor with a condensible gas and for condensing and recycling the condensible gas.

Other objects and advantages will become apparent from the following description taken in conjunction with the accompanying drawings, in which:

FIG. 1 is a flow sheet illustrating the operations and equipment diagrammatically to carry the improved process into practice with two-stage procedure and with provisions for sweeping the second reactor with a condensible inert gas; and FIG. 2 is a flow sheet illustrating the operations and equipment diagrammatically to carry the improved process into practice with two-stage procedure and with provisions for sweeping the second reactor with a condensible inert gas.

Broadly stated, the present invention contemplates an improved process in which clear or filtered fluosilicic acid is treated in a first reactor with definite control of concentration of the sulfuric acid, temperature, and retention time so that essentially or substantially all the silicon tetrafluoride is evolved as a gas while most of the hydrogen fluoride remains in the acid leaving the first reactor. When fluosilicic acid and sulfuric acid are mixed and the hydrogen fluoride and silicon tetrafluoride released as substantially dry gases, it has been found that the release of the hydrogen fluoride is much less rapid than is the release of the silicon tetrafluoride. In other words, the gases are released at two different rates.

Under conditions of retention time and temperature at which a series of experiments were performed [e.g., about two minutes at about 248° F. (120° .)], essentially none of the hydrogen fluoride and above about ninety-six percent of the silicon tetrafluoride were liberated when the specific gravity of the residual solution was about 55.5° Bé. (corresponding to about 70.4% $H_2SO_4$). Under the same conditions when the terminal specific gravity of the acid solution was about 58.5° Bé. (corresponding to about 75.2% $H_2SO_4$), hydrogen fluoride in excess of about 20% was liberated with the residual silicon tetrafluirode (about 2.5%). It is thus apparent that a slight change in the terminal sulfuric acid concentration (in the above case from about 70% to about 75% $H_2SO_4$) results in a substantial change in the quantity of hydrogen fluoride liberated in a given time, yet only a minor change in the quantity of silicon tetrafluoride remaining. As is obvious to one skilled in the art, the concentrations apply only to the retention time and temperature specified. With a longer retention time at the same temperature, the same results would be effected at a lower sulfuric acid concentration, or with a shorter retention time at the same temperature, a higher sulfuric acid concentration would be necessary. For each temperature and retention time, there will be a concentration of sulfuric acid which will result in essentially or substantially all of the silicon tetrafluoride liberated and essentially or substantially all of the hydrogen fluoride retained.

Practical considerations, however, somewhat limit the range of concentrations to be used. At lower concentrations, say below about 50° Bé., either temperatures must be higher causing unnecessary corrosion problems with the equipment or retention time must be long causing larger and more expensive equipment. At higher concentrations above, say about 63° Bé., either the retention time must be kept so low that control becomes a problem, or temperature must be so low that its becomes necessary to heat the highly corrosive sulfuric acid stream containing the dissolved hydrogen fluoride, in order to have sufficiently high temperature in the second reactor.

The range of about 55° Bé. to about 60° Bé. was found to be the most satisfactory. Silicon tetrafluoride gas is absorbed by water or by the water contained in the supply of fluosilicic acid to build up a stronger fluosilicic acid and produce a precipitate of hydrated silica. While any suitable strength sulfuric acid and/or fluosilicic acid can be used, provided they can be mixed in such proportions to yield the desired concentrations in the first and second reactors, certain practical considerations limit the concentrations when the process is carried into practice. In the case where the sulfuric acid is to be concentrated for re-use in the process, a minimum quantity should be used to keep down concentration cost. On the other hand, where the sulfuric acid used in the process is to be used in the production of superphosphate or wet process phosphoric acid, the quantity used must not exceed the quantity consumed in the acidulation of phosphate rock to produce the quantity of fluosilicic acid to be treated. For example, when about one ton of normal superphosphate is produced, approximately 0.36 tons of 100% sulfuric acid are required and from about 15 to about 25 pounds of fluosilicic acid (100% basis) are recovered. The strength of the fluosilicic acid leaving the absorption tower would have to be sufficiently concentrated so that all of it could be reacted with the available sulfuric acid.

The precipitate of hydrated silica is filtered off and washed with water. The clear or filtered fluosilicic acid thus-produced is sent back to the first reactor. Hot sulfuric acid containing most of the hydrogen fluoride goes immediately to the second reactor where more concentrated sulfuric acid is added which brings up the temperature and the concentration. Hydrogen fluoride is released from the sulfuric acid and is condensed in a hydrogen fluoride condenser. The necessary controls and conditions in the second reactor are set forth as follows:

Four inter-related variable factors determine the conditions in the second reactor. They are:
(1) The temperature of the sulfuric acid solution of hydrogen fluoride.
(2) The terminal concentration of the sulfuric acid solution.
(3) The rentention time.
(4) The quantity of condensible inert sweep gas used.

The temperature has as its upper limit the boiling point of the particular strength of sulfuric acid utilized. While there is no theoretical lower limit, practical considerations, however, fix the lower limit in the range around about 90° C. (194° F.). At temperatures much below this range, the release of hydrogen fluoride becomes slow requiring excessive retention time and large equipment for substantially complete release of the hydrogen fluoride.

The terminal sulfuric acid concentration has an upper limit of about 100% $H_2SO_4$ and theoretically has no well defined lower limit. Practically, however, below a concentration of about 65% $H_2SO_4$, release of hydrogen fluoride is excessively slow.

As will be understood by those skilled in the art, retention time is a function of other conditions imposed upon the reaction. Under conditions of high temperature, high sulfuric acid concentration, and large volume of sweep gas, retention time in the order of one minute is sufficient for substantially complete release of the hydrogen fluoride. On the other hand, without sweep gas and at low temperatures and low sulfuric acid concentration, several hours are required.

The larger the ratio of the volume of inert condensible sweep gas to dissolved hydrogen fluoride, the more rapid its release. There are, however, practical limitations to the quantity to be used because of handling expense, etc. In general, from about one-tenth to about three pound moles of inert condensible gas per pound of HF in solution are satisfactory.

The following illustrative examples will enable one skilled in the art to select appropriate combinations of the foregoing factors to provide stated conditions to give the best or preferred results for any given situation.

In carrying the invention into practice using a condensible inert gas which is not absorbed or adsorbed in the sulfuric acid, it is preferred to use the operations and the equipment illustrated in FIGURE 1.

A supply of concentrated sulfuric acid, such as commercially available of about 66° Bé. acid as produced by the conventional contact process, is provided by tank A and a supply of clear or filtered, aqueous fluosilicic acid is provided by tank C. The sulfuric acid flows from tank A through line L–y to heater T which heats it to a selected and controlled temperature. After heating, the hot acid flows through line L–a to meter I which controls the proper amount going to reactor D. Materials of construction to this point can be those conventionally used in the art to handle the strength of sulfuric acid employed as those skilled in the art understand. The fluosilicic acid is also fed to reactor D and flows from tank C through line L–c and meter J which are plastic or rubber lined and which control the amount.

In the first reactor D, such as a graphite or fluorocarbon lined vessel, clear or filtered, aqueous fluosilicic acid is dehydrated by concentrated sulfuric acid. The retention time, temperature, and terminal concentration of the liquid leaving the reactor are controlled so that substantially all of the silicon tetrafluoride and a small portion of the hydrogen fluoride are liberated as gases while most of the hydrogen fluoride remains in the sulfuric acid. Silicon tetrafluoride gases leave reactor D via duct D–f to a plastic or rubber lined absorber G for silicon tetrafluoride.

Fresh aqueous fluosilicic acid flows from tank B through meter K via line L–b to absorber G. To prevent small losses or minimize the escapage of fumes to the atmosphere, additional water may be optionally added to absorber G via line L–m. In the absorber, silicon tetrafluoride reacts with water to form fluosilicic acid and a precipitate of silica. The slurry of silica and fluosilicic acid flows via line L–g to rubber covered filter H where the silica precipitate is removed and is washed with water supplied by line L–i. The clear or filtered fluosilicic acid flows via line L–h and is recycled in the process to plasic or rubber lined tank C. The silica precipitate is removed via conveyor L–j for other uses or further processing.

The sulfuric acid stream flows from the first reactor D via line L–n to graphite or fluorocarbon lined second reactor L. Additional hot concentrated sulfuric acid is added by line L–o through meter N from sulfuric acid supply tank A. In second reactor L, hydrogen fluoride gas is stripped from the solution of sulfuric acid.

In the second reactor, the sulfuric acid becomes diluted with water contained in the fluosilicic acid solution. Such diluted acid is conducted from the second reactor via line L–e to tank E. In the event that it is desired, the diluted sulfuric acid can be concentrated and can be reused in the process for replenishinng the supply of concentrated sulfuric acid in tank A. On the other hand, the diluted sulfuric acid can be used as such in other processes.

The condensible sweep gas carrying hydrogen fluoride leaves the second reactor as a substantially dry gaseous mixture via line L–u and is conducted to an inert condenser Q. In this condenser, the inert sweep gas is condensed to a liquefied state under suitable conditions and the liquefied sweep gas is transported to tank R via line L–v. The condensing of the sweep gas liberates hydrogen fluoride which flows via line L–p to condenser M capable of producing anhydrous hydrogen fluoride. Such hydrogen fluoride is discharged via line L–l as a finished product.

It was discovered that the hydrogen fluoride gas could be removed efficiently by sweeping the second reactor with a condensible inert gas. In general, any gas which is inert to sulfuric acid and hydrogen fluoride, which will not be absorbed or adsorbed therein, and which is a gas at the temperature of the sulfuric acid and a liquid at the temperature in the condenser, is capable of being used to sweep hydrogen fluoride from the sulfuric acid solution.

It was found in practice that normal hexane could be used satisfactorily. Other inert condensible gases may be used including but in no way limited to the following paraffinic hydrocarbons, such as n-pentane, 2,2-dimethylbutane, 2,3-dimethylbutane, 2-methylpentane, 3-methylpentane, n-hexane, 2,2-dimethylpentane, 2,4-dimethylpentane, 2,2,3 - trimethylbutane, 2,3 - dimethylpentane, 2-methylhexane, 3-methylhexane, 3-ethylpentane, n-heptane, 2,2,4-trimethylpentane, 2,2-dimethylhexane, 2,5-dimethylhexane, 2,4-dimethylhexane, 2,2,3-trimethylpentane, 3,3-dimethylhexane, 2,3,4-trimethylpentane, 2,3,3-trimethylpentane, and 2,3-dimethylhexane. It is essential that the condensible gas should not react with hydrogen fluoride or sulfuric acid of any of the ingredients of the solution and should not polymerize etc., under the conditions of the operation as those skilled in the art will understand.

When the sulfuric acid solution in the second reactor is at a temperature of about 200° F. (93°C.) and contains about 0.03 grams of hydrogen fluoride per cubic centimeter of acid solution or about 0.25 pound of hydrogen fluoride per gallon of acid solution, about 40 cubic feet of gas are swept or blown through the second reactor. It has also been found that the smaller the bubble of hexane, the more efficient it is to sweep hydrogen fluoride from the second reactor. For instance, the hexane can be introduced via means for controlling the size of the bubbles of hexane or the size of the stream of hexane. In the event that very small bubbles are required, porous units or the like may be used. Generally speaking, the more hexane or condensible inert gas blown through the second reactor, the larger the percentage of hydrogen fluoride removed or swept from the acid solution under the same conditions of retention time and temperature. As a general rule, about 25 to about 100 cubic feet of hexane at a temperature of about 200° F. (93° C.) per gallon of acid solution will remove about 80% to about 99% of the hydrogen fluoride.

Referring to the drawings, it will be observed that the condensible inert gas, such as hexane, is introduced into the second reactor L through line L–x. The condensible inert gas is stored as a liquid, under pressure if necessary, in the pressurized storage container R. From this container, the liquefied gas is fed via line L–w to boiler S where it is vaporized into a gas or vapor for feeding into the reactor L through line L–x. By sweepinng the reactor with condensible gas, like hexane, the evolution of hydrogen fluoride in the second reactor L is facilitated and the recovery is made efficient. The evolved hydrogen fluoride with the condensible gas leaves the second reactor via line L–u to partial condenser Q where the condensible gas is condensed to a liquid leaving the hydrogen fluoride as a vapor. The liquefied gas, for example hexane, leaves the partial condenser Q via line L–v to pressurized storage container R. The condensing of hexane or other condensible gas liberates hydrogen fluoride which leaves partial condenser Q via line L–p and goes to hydrogen fluoride condenser M. Anhydrous hydrogen fluoride leaves condenser M via line L–l to storage or utilization as a final product.

When selected operating conditions require, such as certain sulfuric acid concentrations, etc., a small quantity of impure aqueous hydrogen fluoride may be condensed in the inlet portion of the condenser. This solution may be recycled via line L–k to the aqueous fluosilicic acid feed tank C. There is also a small quantity of silicon tetrafluoride which enters the second reactor in solution in the sulfuric acid. This is not condensed and is recycled to absorber G via line L–z and duct D–f.

As explained heretofore in detail, the sulufuric acid, which is now diluted with water in the fluosilicic acid and forms a solution, leaves the second reactor through line L–e to tank E. Such diluted sulfuric acid is substantially free of hydrogen fluoride which has been removed by the use of hexane gas or other condensible sweep gas. From this point, the diluted sulfuric acid can be concentrated for re-use in this process or utilized in other processes.

Under certain conditions where the condensible inert gas has such properties that it is adsorbed or absorbed in the sulfuric acid, it is preferred to use the operations and equipment illustrated in FIG. 2 when carrying the invention into practice.

The initial operation in the process is the dehydration of the clear or filtered fluosilicic acid and the separation of silicon tetrafluoride gas from the solution under treatment. Such dehydration and separation can be accomplished in a vessel, such as a packed column. The clear or filtered fluosilicic acid is metered from tank A via line 1 through heater B and line 2 to the dehydrator C. A small amount of $SiF_4$ and HF from the HF condenser J also enters the dehydrator via line 23. Silicon tetrafluoride ($SiF_4$) gas leaves the dehydrator via line 10 to the first stage of a $SiF_4$ scrubber N. Sulfuric acid from supply W flows through lines 3 and 6 and heater D and via line 7 into dehydrator C. The heat of dilution vaporizes $SiF_4$ gas. The sensible heats, heats of dilution, heats of vaporization approximately balance and thus maintain a suitable temperature. Insufficient heat results in lower temperature and unsatisfactory removal of $SiF_4$ gas. On the other hand, excessive heat results in higher temperatures and loss of HF. There is a narrow, however, adequate range of temperature for satisfactory control. Such a range would be about 90° C. (194° F.) to about 120° C. (248° F.).

Concentrated fluosilicic acid is rapidly decomposed by the strong sulfuric acid. A retention time of about 0.5 to about 1.5 minutes is sufficient to liberate essentially all of the $SiF_4$ gas retaining the majority of the HF.

The sulfuric acid leaving the dehydrator via line 11 contains essentially all of the HF component of the fluosilicic acid. Its concentration has been decreased by the water in the fluosilicic acid to about 55° Bé. to about 60° Bé. $H_2SO_4$. It enters the packed HF stripper H at an intermediate height via line 11. The condensible stripping vapor is supplied from line 13 through superheater F and line 14 to the bottom of stripper H. Concentrated sulfuric acid is added to the top of the column via line 12. A small quantity of liquid HF is also fed to top of the stripper via line 57.

In the stripper, the hydrogen fluoride is removed from the sulfuric acid and dried. The sulfuric acid containing about 1.3% HF, which enters the mid-section of the stripper, flows downward through the packed column while the condensible inert gas rises counter-currently. As the gas is adsorbed and/or absorbed, the heats of condensation and dilution varoprizes HF vapor.

Stripping begins as the mixture enters the column. Temperatures increase as the acid flows down the column. HF vapor is liberated and swept up the column. Hot HF-water vapors flow up the column and are cooled and dried by a counter-current stream of 98% $H_2SO_4$ from the top. A small quantity of liquid HF is optionally introduced into the top of the column which vaporizes and cools the ascending vapors below 80° F. (27° C.) where they become anhydrous. The anhydrous vapors flow via line 18 to an entrainment separator I for removal of entrained liquids which are returned to the stripper via line 19.

Hot sulfuric acid is discharged from stripper H via line 15. It is joined by cooled sulfuric acid from line 16 to reduce its temperature before it enters cooler G. After leaving cooler G, a portion recirculates through line 16 and the balance is discharged from the process via line 17.

The anhydrous hydrogen fluoride leaving the entrainment separator I contains a small quantity of silicon tetrafluoride which is removed by rectification. The vapors flow via line 20 to condenser J where they are liquified and cooled to about 20° F. (−7° C.). The equilibrium solubility of $SiF_4$ in anhydrous liquid HF at this temperature is 1.1% $CiF_4$. Liquid HF flows via line 21 through the $SiF_4$ stripper K and then via line 24 to the HF reboiler L where the last trace of $SiF_4$ is removed by holding the HF at its boiling point [67° F. (19° C.)]. The vapors (HF as well as $SiF_4$) pass through line 25 counter-current to liquid HF in the $SiF_4$ stripper. The liquid is heated and a portion of $SiF_4$ is stripped in exchange for HF and passed via line 22 to condenser J. $SiF_4$ escapes as a vapor from the top of the condenser. Depending on the temperature, a given amount of HF is also evolved. At 20° F. (−7° C.) about two parts of $SiF_4$ to about one part of HF are in equilibrium. These vapors recycle via line 23 to the dehydrator. Pure, liquid anhydrous HF leaves the reboiler via line 26 and is pumped to storage M for sale or utilization.

The $SiF_4$–$H_2O$ vapors from the dehydrator are hydrolized to strong fluosilicic acid. With adequate cooling all $SiF_4$ could be recovered in one stage. In general, it is preferable to absorb the $SiF_4$ in counter-current stages to progressively strengthen the fluosilicic acid. The $SiF_4$ vapors are conducted via line 10 to a venturi jet scrubber N where a concentrated fluosilicic acid is produced by absorbing the $SiF_4$ in a less concentrated fluosilicic acid. A flow of fluosilicic acid through the jet nozzle via line 33 entrains the vapors which hydrolyzes a portion of the $SiF_4$ and which produces a slurry of fluosilicic acid and silica which leaves via line 27. The unabsorbed $SiF_4$ passes on to the second absorption stage via line 40. To decrease the temperature in the venturi a large recycle of concentrated fluosilicic acid is added via line 30 to the less concentrated acid fed via line 31. The acids thus mixed flow via line 32 to cooler Q where they are cooled before going to the venturi via line 33.

Silica precipitates as a hydro-gel and occludes a large volume of fluosilicic acid. It is easily filtered, however, in filter "O" with an exceptionally high filtration rate. The fluosilicic acid filtrate flows via line 28 to receiver. From the receiver, a portion is recycled to the venturi via line 30 and the balance flows to tank A via line 29. The filter cake of silica is periodically discharged via line 34 to tank R. Although it appears dry, it is thixotropic and liquefies with agitation. In the liquefied condition, it is pumped via line 35 to centrifuge S where it is further dewatered. Weak fluosilicic acid from absorber U is introduced via line 38 to wash the silica in the filter cake. Wash liquor is transported to tank T via line 39 while the filter cake of silica is transferred via line 37 to storage or utilization.

Operation of the second stage of $SiF_4$ absorption is similar to the first. In this stage, less concentrated fluosilicic acid is produced in absorber N by absorbing $SiF_4$ in a supply of fluosilicic acid. The fluosilicic acid flows to absorber N' through cooler Q'. Silicon tetrafluoride flowing from absorber N via line 40 and fluosilicic acid from Q' flowing via line 46 meet in absorber N' and form a fluosilicic acid-silica slurry. The fluosilicic acid-silica slurry flows to filter O' via line 41. The filtrate from filter O' comprises a clear solution of fluosilicic acid and flows via line 42 to receiver P'. A portion is forwarded to the first stage of the $SiF_4$ absorption via line 31. The balance is recycled via lines 43 and 45 through cooler Q' and into absorber N' via line 46. The silica cake from the filter is handled in the same manner as in the first stage discharging through line 47 into tank R' from where it is pumped via line 48 to centrifuge S'. The clear or filtered fluosilicic acid is separated and flows to tank P' via line 49. Weak fluosilicic acid is supplied via line 51 for washing. Wash returns to tank T via line 52 and the silica precipitate is discharged through line 50. A small portion of the silicon tetrafluoride which is not absorbed in scrubber N' flows via line 53 to scrubber U where it is scrubbed with water supplied through line 54. A weak fluosilicic acid discharges through line 55. A portion of this weak acid is utilized to wash the silica and the balance may optionally be returned to the scrubbers which produce the fluosilicic acid or discarded.

For the purpose of giving those skilled in the art a better understanding of the invention and/or a better appreciation of the advantages of the invention, the following illustrative examples are given:

Example I

For carrying this example into practice, a carbon column packed with carbon rings was used as the first reactor. The down-flow rate was controlled to approximately 17 gallons per hour per square foot; the retention time to about one to about three minutes; the temperature to about 130° C. (266° F.); and the liquid phase leaving the first reactor was about 55° Bé. corrected to 15.6° C. (60° F.).

A carbon column packed with carbon rings was used for the second reactor. Rates were adjusted to provide a down-flow rate in the second reactor of about 17 gallons per hour per square foot. The retention time was controlled to about two to five minutes; the temperature was maintained at about 135° C. (275° F.); and the acid liquid phase was discharged from the reactor at a concentration of 60° Bé. corrected to 15.6° C. (60° F.). The hexane vapor was introduced into the bottom of the second reactor at a rate of about fifty pounds per pound of hydrogen fluoride entering the second reactor.

About 3130 pounds of sulfuric acid (98.5% $H_2SO_4$) was conducted from supply tank A via line L–y to and through heater T. From heater T, the heated acid flowed via line L–a to and through meter I and into the first reactor D. Simultaneously with the flow of sulfuric acid into reactor D, about 1594 pounds of clear or filtered fluosilicic acid (25% $H_2SiF_6$) together with about 5 pounds of hydrogen fluoride was flowed from storage tank C via line L–c to and through meter J and into the first reactor D.

In the first reactor D conditions were controlled including a temperature of about 130° C. (266° F.), a retention time of about one to three minutes, and a down-flow rate of approximately 17 gallons per hour per square foot. The flow of acid was controlled to give a 55° Bé. discharge acid liquid phase from the first reactor D. Silicon tetrafluoride gas was evolved from the acid liquid phase and a major portion of the hydrogen fluoride was retained in the acid liquid phase. About 287 pounds of silicon tetrafluoride gas together with about 10 pounds hydrogen fluoride were exited from the first reactor D via duct D–f and were conducted to the silicon tetrafluoride absorber G. In absorber G, the fluorine gases were absorbed with about 628.5 pounds of fluosilicic acid (20% $H_2SiF_6$) which flowed from fluosilicic acid supply tank B via line L–b to and through meter K and into absorber G. About 717 pounds of water were introduced into absorber G via line L–m. The acid slurry consisting of about 1592 pounds of fluosilicic acid (25.3% $H_2SiF_6$) and about 50.3 pounds of hydrated silica ($SiO_2$) was discharged from absorber G via line L–g to filter H. The filter cake of silica was washed on filter H with about 50 pounds of water from line L–i and was discharged to storage from filter H via line L–j. Incorporated with the silica precipitate were about 45 pounds of water and about 5 pounds of fluosilicic acid ($H_2SiF_6$).

The filtrate from filter H containing about 1954 pounds of clear fluosilicic acid (25% of $H_2SiF_6$) flowed via line L–h to fluosilicic storage tank C. The hot acid phase goes from the first reactor D via line L–n to the second reactor L. The liquid phase contained about 4426 pounds of sulfuric acid (69.65% $H_2SO_4$), about 106 pounds of hydrogen fluoride, and 0.7 pounds silicon tetrafluoride ($SiF_4$). Simultaneously with the acid flow from the first to the second reactor, about 1306 pounds of sulfuric acid (98.5% $H_2SO_4$) were flowed from supply tank A via line L–y to and through heater T. From heater T, the heated acid was conducted via line L–o to and through meter N into the second reactor L.

In the second reactor L, conditions were controlled including a temperature average of about 135° C. (275° F.), a down-flow rate of approximately 17 gallons per hour per square foot, and a retention time of about two to five minutes. The rate of acid additions was controlled so as to give a 60° Bé. liquid acid phase leaving the second reactor L.

The introduction of about 5280 pounds of a vaporized inert condensible gas, such as hexane, into the second reactor caused the efficient evolution of about 105 pounds of hydrogen fluoride from the liquid acid phase. This hydrogen fluoride was exited from second reactor L together with about 5280 pounds of condensible gas, about 0.7 pound of silicon tetrafluoride ($SiF_4$), and about 1 pound of water via line L–u into the partial condenser Q. About 105 pounds of hydrogen fluoride (HF), and about 1 pound of water went via pipe L–p to the hydrogen fluoride condenser M. About 100 pounds of anhydrous hydrogen fluoride were discharged from condenser M via pipe L–l to storage or utilization.

From condenser M, about 5 pounds of impure hydrofluoric acid were recovered. This impure acid comprising about 4 pounds of hydrogen fluoride (HF) and about 1 pound of water went via pipe L–k into storage fluosilicic acid tank C. Appropximately 0.7 pound of silicon tetrafluoride ($SiF_4$) together with a small quantity (about 1 pound) of hydrogen fluoride (H) does not condense and is returned to absorber G via line L–z and duct D–f.

About 5280 pounds of condensed vapor from partial condenser Q flow via line L–v into the pressurized storage container R. For use and re-use, the thus-liquefied vapor goes from container R via line L–w into boiler S where it is vaporized and enters reactor L via line L–x. The defluorinated sulfuric acid (77.67% $H_2SO_4$) containing about 0.6 pound HF leaves the second reactor L via line L–e and into storage tank E.

*Example II*

FIG. 2 depicts one method of carrying the process into practice when a condensible vapor is used which is adsorbed and/or absorbed in the sulfuric acid.

The initial operation in the process is the dehydration of the fluosilicic acid and the separation of the silicon tetrafluoride gas. This can be accomplished in a single vessel, such as a packed column as indicated by the reference character "C" in FIG. 2. Clear or filtered fluosilicic acid (31% $H_2SiF_6 \cdot SiF_4$) is metered at the rate of about 27.8 pound/minute from tank A via line 1 to heater B where the temperature is controlled at about 140° F. (60° C.). From the condenser J a small amount of $SiF_4$ and HF, 0.008 and 0.004 pound/minute, respectively, enters the dehydrator via line 23. Silicon tetrafluoride gas leaves the dehydrator via line 10 to the first stage of the $SiF_4$ scrubber N. Sulfuric acid from supply W flows through lines 3 and 6 to heater D where its temperature is raised to about 275° F. (136° C.). From the heater D it is metered via line 7 at the rate of about 65.2 pounds/minute into dehydrator C. The heat of dilution vaporizes $SiF_4$ vapor. The sensible heats, heats of dilution, and heats of vaporization balance and bring the system to about 220° F. (104° C.). Insufficient heat results in lower temperature and unsatisfactory removal of $SiF_4$. Excessive heat results in higher temperatures and loss of HF. There is a narrow, however, adequate range of temperature for satisfactory control. It is preferred to employ a range of about 90° C. (194° F.) to about 120° C. (248° F.).

Concentrated fluosilicic acid is rapidly decomposed by the strong sulfuric acid. A retention time of about 0.5 to about 1.5 minutes is sufficient to liberate essentially all of the $SiF_4$ gas while retaining the majority of the HF.

The sulfuric acid leaving the dehydrator via line 11 contains essentially or substantially all of the HF component of the fluosilicic acid. Its concentration has been reduced by the water in the fluosilicic acid to about 75% $H_2SO_4$. It enters the packed HF stripper H at an intermediate height via line 11 at a rate of about 85.2 pounds/minute. Line 13 indicates a source of steam which supplies about 3.86 pounds/minute to superheater F where its temperature is raised to about 375° F. (191° C.). From the superheater, it is fed through line 14 to the bottom of stripper H. Concentrated (about 98%) sulfuric acid is added to the top of the column via line 12 at a rate of about 20.7 pounds/minute. A small quantity (about 0.14 pound/minute) of liquid HF is also fed to top of the stripper via line 57.

In the stripper, the hydrogen fluoride is removed from the sulfuric acid and dried. The sulfuric acid containing about 1.3% HF which enters the midsection of the stripper flows downward through the packed column while the superheated steam rises counter-currently. As the steam adsorbed and/or absorbed, the heat of condensation and dilution vaporize HF vapor and boil the $H_2SO_4$.

Stripping begins as the mixture enters the column. Temperatures increase as the acid flows down the column and reach the boiling point [375° F. (191° C.)] at the bottom. HF vapor is swept up the column. Hot HF–water vapors flow up the column and are cooled and dried with a counter-current stream of 98% $H_2SO_4$ from the top. The small quantity of liquid HF introduced into the top of the column vaporizes and cools the ascending vapors below 80° F. (27° C.) where they become anhydrous. The anhydrous vapors flow via line 18 to an entrainment separator I for removal of entrained liquids which are returned to the stripper via line 19.

Boiling 77.7% sulfuric acid is discharged from stripper "H" via line 15. It is joined by cooled sulfuric acid from line 16 to reduce its temperature below about 300° F. (149° C.) before it enters cooler G. After leaving cooler G a portion recirculates as above through line 16 and the balance is discharged via line 17 from the process.

The anhydrous hydrogen fluoride leaving the entrainment separator I contains a small quantity of silicon tetrafluoride which is removed by rectification. The vapors flow via line 20 to condenser J where they are liquified and cooled to about 20° F. (−7° C.). The equilibrium solubility of $SiF_4$ in anhydrous liquid HF at this temperature is about 1.1% $SiF_4$. Liquid HF flows via line 21 through the $SiF_4$ stripper "K" and then via line 24 to the HF reboiler L where the last trace of $SiF_4$ is removed by holding the HF at its boiling point [67° F. (19° C.)]. The vapors, HF as well as $SiF_4$, pass through line 25 countercurrent to liquid HF in the $SiF_4$ stripper. The liquid is heated and a portion of $SiF_4$ is stripped in exchange for HF and passed via line 22 to condenser J. $SiF_4$ escapes as a vapor from the top of the condenser. Depending on the temperature, a given amount of HF also evolves. At about 20° F. (−7° C.), two parts of $SiF_4$ to one part of HF are in equilibrium. These vapors recycle via line 23 to the dehydrator where the HF is selectively reabsorbed. Pure, liquid anhydrous HF leaves the reboiler via line 26 and is pumped at a rate of about 1.4 pounds/minute to storage M for sale or utilization.

The $SiF_4$–$H_2O$ vapors from the HF absorber are hydrolyzed to strong fluosilicic acid. With adequate cooling all $SiF_4$ could be recovered in one stage. The final strength of the fluosilicic acid depends on the temperature of absorption. I prefer, however, to absorb the $SiF_4$ in countercurrent stages to progressively strengthen the fluosilicic acid. The $SiF_4$ vapors are conducted via line 10 to venturi jet scrubber N where a 31% fluosilicic acid is produced by absorbing the $SiF_4$ in a 10% fluosilicic acid at about 140° F. to about 150° F. (about 60° C. to about 65° C.). A flow of fluosilicic acid through the jet nozzle via line 33 entrains the vapors, hydrolyzing a portion of the $SiF_4$, and produces a slurry of fluosilicic acid and a precipitate of silicia which leave scrubber N via line 27. The unabsorbed $SiF_4$ passes on to the second absorption stage via line 40. To keep the temperature in the venturi under 150° F. (65+° C.), a large recycle of 31% fluosilicic acid is added via line 30 to the 10% acid fed via line 31. This mixed acid flows via line 32 to cooler Q where it is cooled to 140° F. (60° C.) before going to the venturi via line 33.

Silicia precipitates as a hydro-gel and occludes a large volume of fluosilicic acid. It is easily filtered, however, in filter O with an exceptionally high filtration rate. The 31% fluosilicic acid filtrate flows via line 28 to receiver P. From this receiver a portion is recycled to the venturi via line 30 and the balance (about 27.8 pounds/minute) flows to tank A via line 29. The filter cake of silicia is periodically discharged via line 34 to tank R. The filter cake contains about 5% silicia dry solids and 95% fluosilicic acid. Although it appears dry, it is thixotropic and liquefies with agitation. It is pumped via line 35 to centrifuge S where it is further dewatered to about 25% solids. Weak fluosilicic acid from absorber U is introduced via line 38 to wash the silicia. Wash liquor is transported to tank T via line 39 while the silicia is transferred via line 37 to storage or utiliziation.

Operation of the second stage $SiF_4$ absorption is similar to the first. In this stage 10% fluosilicic acid is produced in absorber N' by absorbing $SiF_4$ in 8% fluosilicic acid. Cooling is not necessary to produce fluosilicic acid at these low concentrations. To improve absorption, however, I prefer to cool the fluosilicic acid flowing to the absorber using cooler Q'. Silicon tetrafluoride flowing from absorber N via line 40 and fluosilicic acid from Q' flowing via line 46 meet in absorber N' and form a fluosilicic acid-silicia slurry. The fluosilicic acid-silicia slurry formed flows to filter O' via line 41. Filtrate from filter O' comprises clear 10% fluosilicic acid and flows via line 42 to receiver P'. A portion is forwarded to the first stage $SiF_4$ absorption via line 31. The balance is recycled via lines 43 and 45 through cooler Q' and into absorber N' via line 46. The filter cake silicia is handled in the same manner as in the first stage discharging through line 47 into tank R' from where it is pumped via line 48 to centrifuge S'. The fluosilicic acid is separated and flows to tank P' via line 49. Weak fluosilicic acid is supplied via line 51 for washing. Wash returns to tank T via line 52 and the silica is discharged through line 50. A very small portion of the silicon tetrafluoride is not absorbed in scrubber N'. This quantity is greatly reduced by operating N' at a lower temperature. The $SiF_4$ which is not absorbed flows via line 53 to scrubber U where it is scrubbed with water supplied through line 54. A weak fluosilicic acid discharges through line 55. A portion of this weak acid is utilized to wash the silicia and the balance may optionally be returned to the scrubbers which produce the fluosilicic acid or discarded. In this particular example, I have used a fluosilicic acid which was available and which analyzed 8% $H_2SiF_6 \cdot SiF_4$. It is introduced to tank T at a rate of about 21.5 pounds/minute via line 56.

*Example III*

The operations of Example III are similar to those of Example II, except sulfur trioxide is employed as the inert condensible gas which is used for sweeping the HF vapor from the acid solution.

Operational steps are the same as in Example II, but a flow of about 17.14 pounds/minute of $SO_3$ is used and is furnished by supply 13 through superheater F and line 14 into the bottom of stripper H. The $SO_3$ vapors rise through the stripper liberating HF vapor as they are adsorbed and/or absorbed in the sulfuric acid. Final adsorption and/or absorption of the $SO_3$ takes place in the cooler which is the upper portion of the stripper. From the bottom of the stripper through line 15, hot 91% $H_2SO_4$ (about 69.92 pounds/minute) is discharged. This stream is mixed with a stream of cooled acid entering via line 16 before entering the cooler G. From cooler G a portion is recycled through line 16 and the balance is transported to further utilization through line 17.

The present process is particularly valuable for a plant producing anhydrous hydrogen fluoride which desires a more concentrated sulfuric acid for further use than that obtainable in the previous examples.

The present invention is particularly applicable to situations such as the following:

In the manufacture of superphosphate, the phosphate rock normally employed contains from about three to about four percent fluorine. In the operation, about 25 to about 49% of the fluorine is evolved and must be scrubbed from the vapors leaving the den. When absorbed in water, a dilute fluosilicic acid results, which frequently presents a disposal problem. Sulfuric acid as produced by the contact process is more concentrated than is optimum for the production of superphosphate. The discovery herein disclosed affords a method of converting the otherwise undesirable waste fluosilicic acid into a valuable product, anhydrous hydrogen fluoride, at the same time converting the sulfuric acid to be used to a more desirable strength.

The same situation is true in the production of "wet process" phosphoric acid in which about 20% to about 50% of the fluorine values in the rock are liberated and must be recovered. From the tremendous tonnage of phosphatic fertilizers consumed each year, the great value of this discovery is apparent.

In still another section of the art, this discovery has great value. The resources of high grade fluospar used in the production of hydrogen fluoride by conventional processes are somewhat limited. This process permits the utilization of low grade (high silica) fluospar ($CaF_2$). The fluospar is acidulated with the used acid from the process and the fluoride containing vapors absorbed in water to produce a mixture of hydrofluoric acid and fluosilicic acid. Said mixture can then be converted by this process to pure anhydrous hydrogen fluoride.

Although the present invention has been described in conjunction with preferred embodiments, it is to be understood that modifications and variations may be resorted to without departing from the spirit and scope of the invention, as those skilled in the art will readily understand. Thus, when the term "adsorbing" condensible sweep gas in sulfuric acid solution is specified, it includes adsorbing or absorbing or adsorbing and absorbing. Such modifications and variations are considered to be within the purview and scope of the invention and appended claims.

I claim:

1. In a process of producing hydrogen fluoride as a vapor from fluosilicic acid-containing solutions with a two-stage procedure, the improvement which comprises subjecting a fluosilicic acid-containing solution substantially free from silica to the action of heated concentrated sulfuric acid in quantity sufficient to control the terminal concentration below about 78% $H_2SO_4$ in a closed reactor in the first stage under conditions of temperature and retention time so that substantially all of the silicon tetrafluoride is evolved in the first stage as a substantially dry vapor while most of the hydrogen fluoride is retained in the remaining diluted weaker sulfuric acid solution, withdrawing said vapor containing silicon tetrafluoride from said closed reactor in said first stage, removing said diluted weaker sulfuric acid solution containing hydrogen fluoride from said closed reactor in the first stage, conducting said removed solution to a closed reactor in a second stage, introducing into said closed reactor hot concentrated sulfuric acid in quantity sufficient to raise the sulfuric acid concentration in said reactor to at least about 65% $H_2SO_4$ to effect the liberation of hydrogen fluoride as substantially dry vapor, and passing an inert condensible sweep gas selected from the group consisting of paraffinic hydrocarbons, steam and sulfur trioxide into said solution in said second reactor in said second stage in a quantity equivalent to from about one-tenth to about three-pound moles of inert condensible gas per pound of hydrogen fluoride in solution to facilitate the liberation of substantially all of the hydrogen fluoride as a vapor from said solution.

2. The improved process set forth in claim 1 in which heated concentrated sulfuric acid in quantity sufficient to control the terminal concentration below about 78% $H_2SO_4$ is introduced into the fluosilicic acid-containing solution substantially devoid of free silica in the first stage under conditions of temperature and retention time so that substantially all of the silicon tetrafluoride is evolved in the first stage as substantially dry vapor while most of the hydrogen fluoride is retained in the remaining diluted weaker sulfuric acid solution, hot concentrated sulfuric acid is also introduced into said closed reactor sufficient to raise the terminal sulfuric acid concentration in said second reactor to at least about 65% $H_2SO_4$ to effect the liberation of practically all of the hydrogen fluoride as a vapor, and inert condensible sweep gas is blown into said solution in said second reactor in said second stage in a quantity equivalent to from about one tenth to about three pound moles of inert condensible gas per pound of hydrogen fluoride in solution to facilitate the liberation of substantially all of the hydrogen fluoride as a vapor from said solution.

3. The improved process set forth in claim 1 in which the silicon tetrafluoride vapor is absorbed in an aqueous solution and a reaction with water is effected to form fluosilicic acid and precipitated hydrated silica, and the hydrated silica is removed from said solution to provide clear fluosilicic acid substantially devoid of free silica which is recycled to said first operation for treatment with hot sulfuric acid in the closed reactor in the first stage.

4. The improved process set forth in claim 1 which is used for the manufacture of concentrated hydrofluoric acid and/or anhydrous hydrofluoric acid from fluosilicic acid and/or from a mixture of fluosilicic acid and hydrofluoric acid with the production of hydrated silica as a by-product.

5. The improved process set forth in claim 1 which is capable of converting substantially all of the fluorine in fluosilicic acid to hydrogen fluoride while producing hydrated silica as a by-product.

6. The improved process set forth in claim 1 which is used for manufacturing hydrofluoric acid involving the use of strong contact process sulfuric acid to dehydrate aqueous fluosilicic aicd and to decompose the fluosilicic acid into its component vapors while at the same time obtaining satisfactory dilution of sulfuric acid for use in acidulation process for the production of chemical products consisting of phosphoric acid and superphosphate.

7. The improved process set forth in claim 1 in which the terminal sulfuric acid concentration has an upper limit of about 100% $H_2SO_4$ and a lower practical limit of about 65% $H_2SO_4$.

8. The improved process set forth in claim 1 in which the inert condensible gas is normal hexane.

9. The improved process as set forth in claim 1 in which about 25 to about 100 cubic feet of hexane are used at a temperature of about 200° F. (93° C.) per gallon of acid solution whereby about 80% to about 99% of hydrogen fluoride is removed.

References Cited by the Examiner

UNITED STATES PATENTS

| | | | |
|---|---|---|---|
| 465,607 | 12/1891 | Beylikgy | 23—153 |
| 1,851,652 | 3/1932 | Soll et al. | 23—153 |
| 1,938,533 | 12/1933 | Penfield | 23—153 |
| 1,960,347 | 5/1934 | Osswald et al. | 23—153 |
| 2,833,628 | 5/1958 | Molstad | 23—205 |
| 2,952,334 | 9/1960 | Provoost et al. | 23—153 X |
| 3,024,086 | 3/1962 | Cines | 23—153 X |

FOREIGN PATENTS

| | | |
|---|---|---|
| 387,614 | 2/1933 | Great Britain. |

MAURICE BRINDISI, *Primary Examiner.*

UNITED STATES PATENT OFFICE
CERTIFICATE OF CORRECTION

Patent No. 3,218,128 November 16, 1965

Fred J. Klem

It is hereby certified that error appears in the above numbered patent requiring correction and that the said Letters Patent should read as corrected below.

Column 8, line 51, for "1954" read -- 1594 --; column 9, line 15, for "(H)" read -- (HF) --; column 10, line 8, after "steam" insert -- is --; same line 8, for "heat" read -- heats --; column 11, lines 4, 6, 11, 12 and 29, for "silicia", each occurrence, read -- silica --; line 13, for "utiliziation" read -- utilization --; same column 11, line 23, for "acid-silicia", each occurrence, read -- acid-silica --.

Signed and sealed this 27th day of September 1966.

(SEAL)
Attest:

ERNEST W. SWIDER
Attesting Officer

EDWARD J. BRENNER
Commissioner of Patents